April 28, 1970          R. E. NEITZEL          3,508,403
TURBOFAN ENGINES
Filed March 28, 1968          4 Sheets-Sheet 1
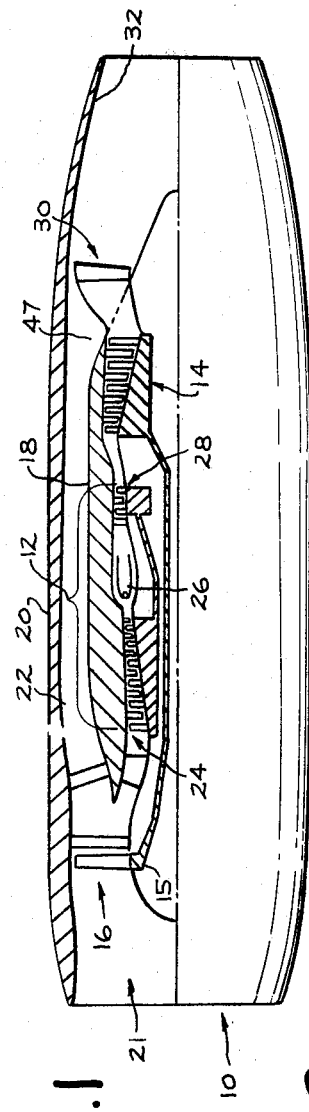
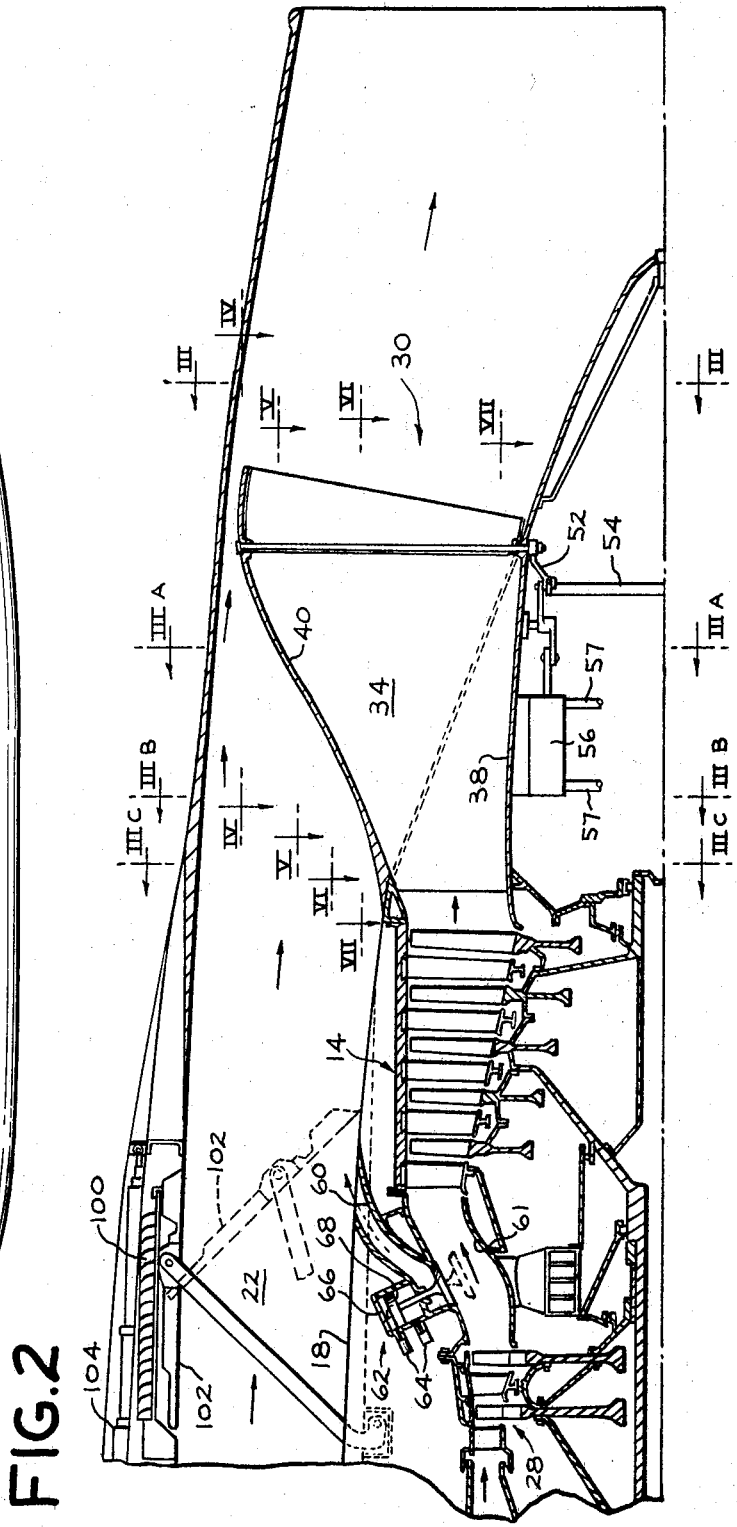

April 28, 1970 R. E. NEITZEL 3,508,403
TURBOFAN ENGINES
Filed March 28, 1968 4 Sheets-Sheet 2
FIG.3
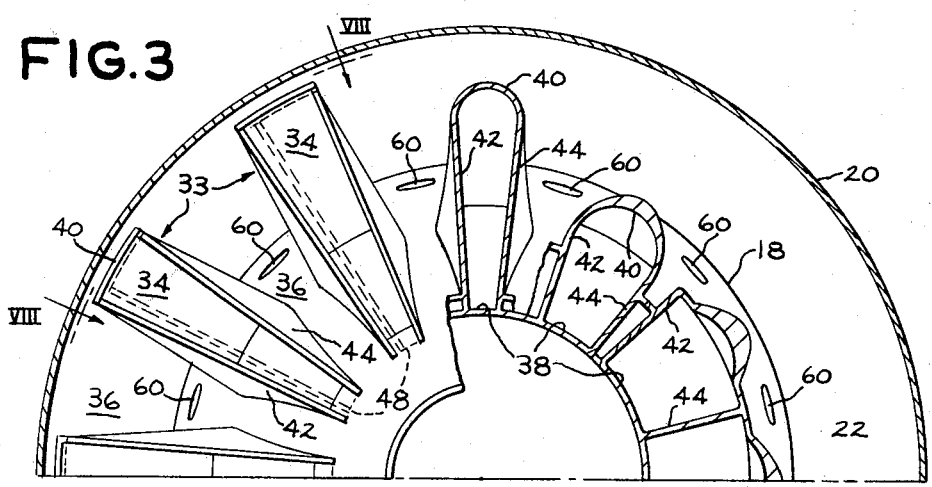
FIG. 4
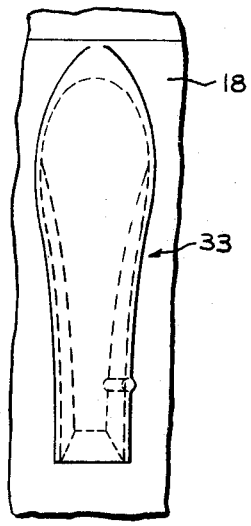
FIG. 5
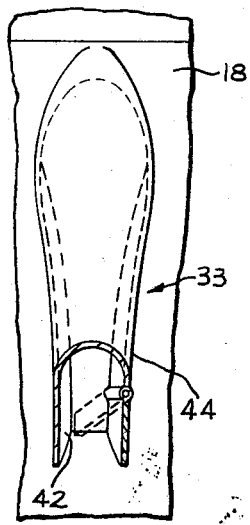
FIG. 6
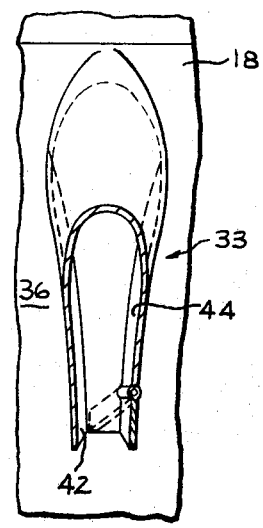
INVENTOR
ROBERT E. NEITZEL
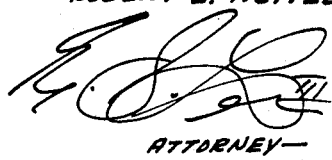
ATTORNEY

INVENTOR
ROBERT E. NEITZEL

ATTORNEY

April 28, 1970  R. E. NEITZEL  3,508,403
TURBOFAN ENGINES
Filed March 28, 1968  4 Sheets-Sheet 4
FIG. 11
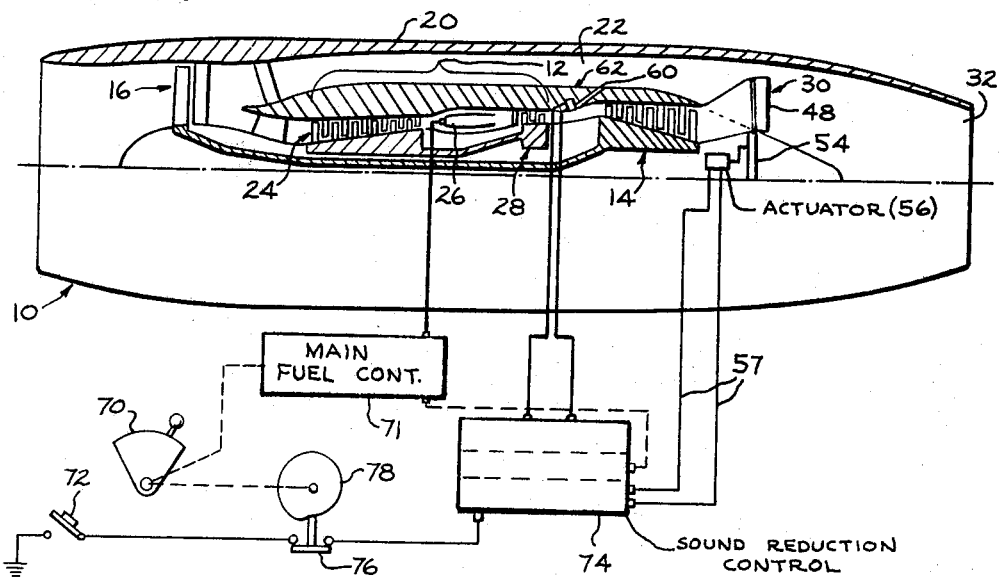
FIG. 12
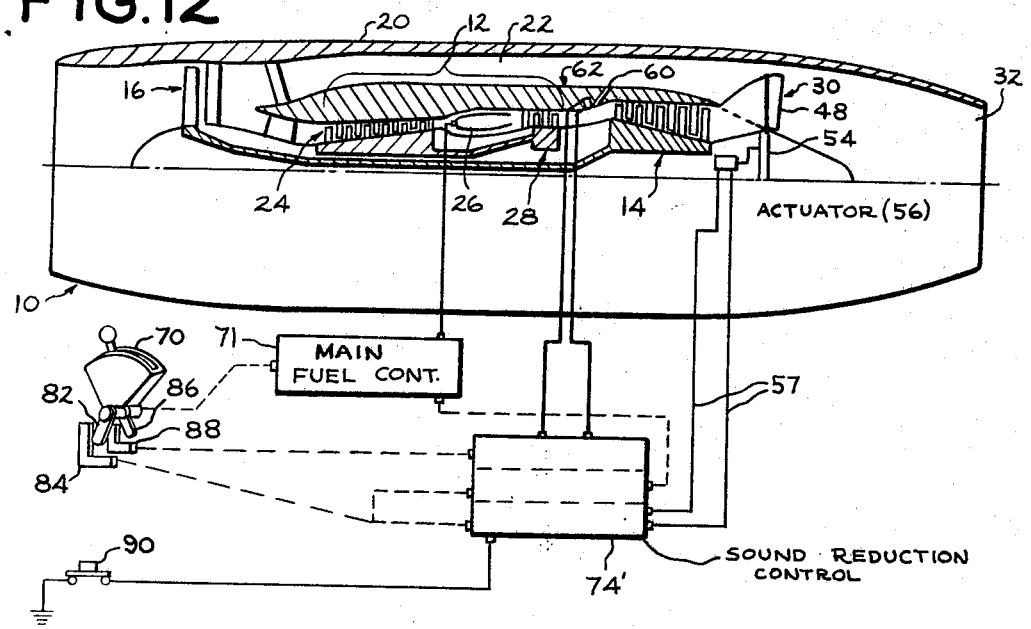
INVENTOR
ROBERT E. NEITZEL
ATTORNEY

United States Patent Office 3,508,403
Patented Apr. 28, 1970

3,508,403
TURBOFAN ENGINES
Robert E. Neitzel, Marblehead, Mass., assignor to General Electric Company, a corporation of New York
Filed Mar. 28, 1968, Ser. No. 716,943
Int. Cl. F02k *3/02*
U.S. Cl. 60—226                30 Claims

ABSTRACT OF THE DISCLOSURE

The disclosure shows a turbofan engine in which the hot gas stream of its core engine is mixed by a lobed mixer with the pressurized fan stream. The fan stream duct maintains the fan stream at a relatively high velocity, then decelerates it at the mixer entrance, and then accelerates it through the mixer, all to minimize energy losses. The mixed streams are discharged from a common propulsive nozzle. Means are provided for reducing the discharge area of the hot gas stream from the mixer. This reduces fan speed and the noise generated by the fan, under conditions of reduced thrust output where noise is a critical factor. Aerodynamic overloading of the core engine compressor is prevented and a further reduction in fan speed is attained by diverting a portion of the hot gas stream, from a point intermediate the core engine turbine and the fan turbine, into the fan stream. Control means are provided for increasing fuel flow to maintain a desired thrust output when fan speed is reduced to obtain noise reduction. A thrust reverser cascade is provided in the outer cowl of the engine. Blocker doors divert fan flow through the cascade to obtain a reversal of thrust. When this is done, the thrust of the hot gas stream is "spoiled," thereby providing a desired reverse thrust capability in an extremely simple fashion.

---

The present invention relates to improvements in gas turbine engines and more particularly to improvements in turbofan engines and control systems therefor which reduce their noise levels.

Turbofan engines are generally characterized by a core engine which generated a hot gas stream. The core engine drives a fan which pressurizes an air stream in a duct generally concentric of the core engine. These two streams are most commonly discharged through separate nozzles to provide a propulsive force. Alternatively it has been proposed that the fan and hot gas streams be discharged through a common nozzle.

The ratio of the mass of air flowing through the fan duct to the mass of air passing through the core engine is referred to as the bypass ratio. Recent developments have demonstrated that for a given engine weight, increased propulsive force and reduced fuel consumption can be attained from turbofan engines having a relatively high bypass ratio, for example, 5/1 or higher.

In order to obtain such high bypass ratios, the diameter of the fan blades has become quite large, and the tip speeds of the blades quite high, in fact, supersonic. Such large diameters and high speeds have resulted in the fan becoming the predominant source of objectionable noise in the propulsion of aircraft. This is opposed to earlier turbojet and low bypass ratio turbofan engines where the predominant noise source resulted from the discharge of the hot gas stream from its propulsive nozzle.

Many proposals have been made to minimize or suppress the noise generated by the fan of a turbofan engine. However, all prior proposals have, in one fashion or another, imposed weight penalties on the engine or otherwise reduced the overall effectiveness of the engine.

The problem of noise is of concern mainly as its affects populated areas adjacent an airport. In this connection there are two portions in an airplane's flight regime where noise levels are considered particularly critical. One critical portion is during landing approach. The other critical portion is during takeoff. During takeoff maximum thrust or power is utilized to attain a safe operating height. At this point the power of the engines is cut back and a much lower rate of climb is maintained until an altitude or distance is reached where noise is no longer a particular problem. In this fashion it is possible to minimize the area adjacent an airport where noise is a troublesome factor.

One object of the present invention is to reduce the noise levels of turbofan engines with a minimum effect on the engine's performance and particularly to reduce noise during approach and during takeoff after reaching the power cutback point referred to above.

As was indicated above, the predominant source of noise in high bypass ratio turbofan engines is generated by the fan. It is well known that fan noise levels can be reduced by reducing fan speed, i.e., rate of rotation. The present invention provides means for obtaining significantly lower fan speeds and resultant reduced fan noise, while at the same time maintaining the overall noise generated by the engine at a minimum value. More specifically these ends are attained in a turbofan engine by providing a mixer for the hot gas stream of the core engine and the air stream pressurized by the fan. The mixed fluid streams are then discharged from a common propulsive nozzle.

When sound reduction is desired, as during approach and at power cutback point, means are provided for reducing the outlet area of the mixer passageways through which the hot gas stream passes. This increases the back pressure on the fan turbine and thus reduces fan speed. It will also be apparent that with reduced fan speed, the hot gas stream comprises a greater proportion of the mixed stream which is discharged through the propulsive nozzle. To maintain a desired level of thrust the energy level of the hot gas stream is increased to compensate for the reduced energy level of the fan stream. Where a large increase in the energy level of the hot gas stream is to be obtained, means are provided for diverting a portion of the hot gas stream from a point intermediate the core engine turbine and the fan turbine, into the fan duct. By doing this, aerodynamic loadings on the core engine compressor are minimized and the temperature levels of the hot gas stream may be maintained within tolerable limits. A further effect in diverting the hot gas stream in this fashion is that the pressure drop across the fan turbine is further reduced to obtain even more significant reductions in fan noise level.

While it is desirable to reduce noise levels of aircraft where they are objectionable to the general populace, it is also imperative that the pilot of an aircraft not be unduly burdened with operations and adjustments which would distract him from safe operation of the aircraft. Accordingly, another object of the invention is to provide improved control systems for assuring a desired thrust output of turbofan engines which are operating under a sound reduction regime with reduced fan speed.

In its broader aspects this object of the invention is attained by the provision of means for increasing the ratio of propulsive energy derived from the hot gas stream to the ratio of propulsive energy derived from the fan stream of a turbofan engine, and concurrently increasing the energy level of the hot gas stream. Where fan speed is reduced by throttling the hot gas stream discharge, as referenced above, a cockpit control may be actuated by the pilot to simultaneously cause a reduction in the discharge area of the hot gas stream passageways through the mixer and at the same time flow of fuel to the core engine combustor is increased to maintain a thrust output corresponding to the setting of the pilot's throttle lever. At the same time bleed valves may be opened to divert a portion of the hot gas stream intermediate the core engine and fan turbines into the fan duct. Additionally, means are provided which inactuate, or prevent actuation of, the sound reduction mode of operation when the pilot's throttle lever is moved to a position calling for thrust or rate of engine operation above a given level.

Alternatively, means can be provided for progressively actuating the sound reduction mode of operation, i.e., reduced fan speed and increased core engine energy level, as the throttle lever is moved to reduced rates of engine operation. In this case it is preferable that means be provided for inactuating the sound reduction mode of operation, such means being selectively actuated at the pilot's option.

While noise reduction is a factor of particular importance, it is also of great importance that initial cost and the cost of operation of engines used in the propulsion of aircraft be minimized. The present invention, in mixing the hot gas and fan streams and providing mechanism for reducing fan speed, inherently adds weight and, to some extent, length to the engine. These factors which tend to increase cost are potentially compensated for by an increase in the theoretical cycle efficiency of discharging a mixed stream through a common nozzle, as compared to mixing the fan stream and hot gas stream through separate nozzles.

Another object of the invention is to more fully realize the potential advantages of a mixed flow cycle turbofan engine.

In attaining this object means are provided for minimizing energy losses, in mixing the hot gas and fan streams. This involves providing a mixer having alternate chutes for the hot gas stream and the fan stream wherein the chutes have an area reduction from their inlets to their outlets so that the gas stream flows are accelerated therethrough. Further, it involves providing means for maintaining the fan stream at a relatively high velocity as it passes through the major portion of the fan duct and then providing a diffuser section immediately in advance of the mixer to reduce the fan stream velocity as it initially changes direction in entering the mixer.

Not only do turbofan engines present problems insofar as their operating noise levels are concerned, but it is also difficult to obtain reverse thrust necessary to meet, for example, landing requirements wherein an aircraft must be brought to a halt within a reasonably short distance after touching down on a runway. A turbofan engine advantageously provides a cool fan stream from which a reverse thrust can be derived with relatively simple mechanisms. The hot gas stream of such engines presents a problem in that it continues to generate a forward thrust. This has led to the conclusion by many persons that two mechanisms, one for the fan stream and the other for the hot gas stream, are required to obtain sufficient reverse thrust capability.

Another object of the present invention is to provide improved, simplified means for obtaining improved reverse thrust capability from a turbofan engine.

It has been discovered that a turbofan engine employing a mixer for the hot gas and fan streams, as discussed above, is uniquely adapted to satisfy the above object. By providing means for blocking the fan flow upstream of the mixer, and diverting it outwardly, preferably with a reverse velocity component, reverse thrust is attained. When the fan flow is diverted, the hot gas stream becomes overexpanded and loses a very substantial proportion of its propulsive effectiveness as it is discharged through the common nozzle. Additionally, the pressure ratio across the fan turbine is increased and fan flow is increased to provide further reverse thrust.

The above and other related objects and features of the invention will be apparent from a reading of the following description of the disclosure found in the accompanying drawings and the novelty thereof pointed out in the appended claims.

In the drawings:

FIGURE 1 is a view on a greatly reduced scale and partially in simplified, longitudinal section of a turbofan engine embodying the present invention;

FIGURE 2 is a longitudinal section, on an enlarged scale, of the nozzle end portion of the engine;

FIGURE 3 is a section taken progressively on lines III—III, III—IIIA, III—IIIB, III—IIIC in FIGURE 2;

FIGURE 4 is a view taken on line IV—IV in FIGURE 2;

FIGURE 5 is a section taken on line V—V in FIGURE 2;

FIGURE 6 is a section taken on line VI—VI in FIGURE 2;

FIGURE 11 is a view similar to FIGURE 1 diagrammatically illustrating a control system of the present invention; and FIGURE 12 is a view to similar to FIGURE 1 illustrating another control system of the present invention.

Figure 7:
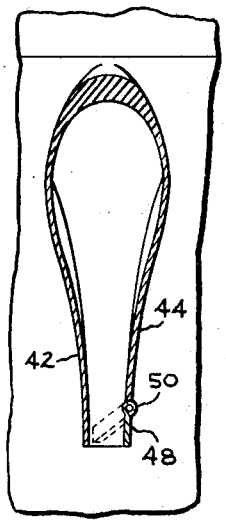
FIGURE 7 is a section taken on line VII—VII in FIGURE 2.

The turbofan engine 10, seen in FIGURE 1 comprises a core engine 12 which generates a hot gas stream for driving a fan turbine 14. The turbine 14 is connected to and drives the rotor 15 of a fan 16 disposed at the inlet end of the engine. The core engine 12 and the fan turbine 14 are disposed within a nacelle or inner casing 18. An elongated cowl, or outer casing 20, defines the engine inlet indicated at 21 and, in combination with the nacelle 18, defines a duct 22, concentric of the core engine 12.

In operation, the fan 16 pressurizes an air stream, the outer portion of which passes along the duct 22 and the inner portion of which enters the core engine 12. In the core engine, the air stream is further compressed by a core engine compressor 24 to provide a highly pressurized air stream for supporting combustion of fuel in a combustor 26. The hot gas stream thus generated drives a high pressure, core engine turbine 28 which is connected to the rotor of the compressor 24. The hot gas stream passes through an outwardly curved annular duct 61, to the fan turbine 14. The fan stream and the hot gas stream pass through a mixer 30 and then are discharged from a nozzle 32 to provide thrust for propulsion of an aircraft.

Figure 8:
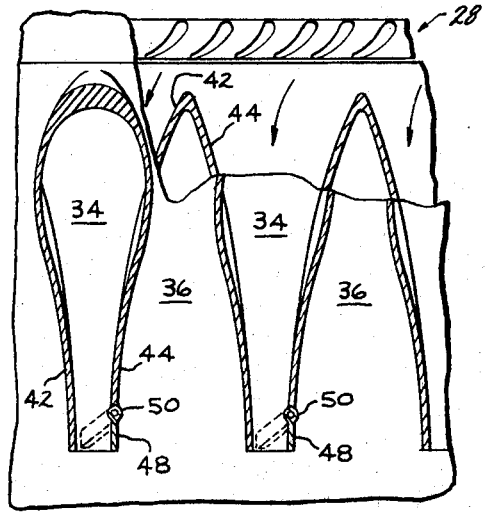
FIGURE 8 is a development taken on line VIII—VIII in FIGURE 3, with portions broken away to illustrate both fan stream flow and hot gas stream flow.

Reference is next made to FIGURES 2, 3, and 8 for a more detailed description of the mixer 30. The mixer 30 comprises a plurality of lobes 33 which project into the fan stream duct 22. The lobes form alternating chutes 34, 36 through which the hot gas stream and the fan stream respectively pass to be mixed downstream of the lobes 33. The hot gas stream flow path through the chutes 34 is defined by an inner wall 38, an outer wall 40, and side walls 42, 44 of the lobes 33. The upstream ends of adjacent walls 42, 44 (FIGURE 8) are joined to divide the hot gas stream flow, from the turbine 14, as it enters the chutes 34. The fan stream chutes 36 are defined by the outer cowl 20, the nacelle 18 as it continues between the lobes 33, and by the outer wall 40 and side walls 42, 44 of these lobes. The outer walls 40 of the lobes 33 are spaced from the inner surface of the cowl 20 so that there is a continuous flow of relatively cool air along the inner surface of the cowl to avoid hot streaks on the inner surface of the cowl in the mixing zone downstream of the discharge plane of the mixer.

In order that there will be a minimum of losses as the fan stream and hot gas stream pass through the mixer and are effectively mixed in a relatively short axial length, the outlet openings of the hot gas chutes 34 are configured so that the mass flow rate at any radial point in the discharge plane of the hot gas stream and the cold gas stream are essentially equal. Advantageously this is attained by forming the major portions of the walls 42, 44 radially of the axis of the duct 22 with the included angle between these walls decreasing toward the chute outlets. The progressive breakaways in FIGURE 3 illustrate that the cross section of the hot stream flow path is progressively transformed to an annular segment outline wherein there is greater mass flow in the outer portions of the chute than at the inner portions.

A further factor in minimizing losses of the fluid streams flowing through the mixer is found in the fact that the hot gas stream chutes 34 provide a nozzle effect. That is, they have a larger area at their inlets than at their outlets and therefore accelerate tthe stream flowing therethrough into the discharge plane. FIGURES 2 and 4–7, in combination with the breakaways of FIGURE 3, illustrate the nozzle effect described above, which provides for an acceleration of the hot gas stream through the chutes 34 to thereby minimize losses as the hot gas stream passes through the mixer.

Similar features are provided in the fan stream chutes 36 by the present mixer. The lobe walls are able to define both hot gas stream and fan stream chutes by a thin-walled construction having essentially uniform wall thickness. The diameter of the nacelle 18 is decreased as it passes between the lobes 33. This dimension is controlled so that there is a decrease in the areas of the fan stream chutes from their inlets to their exits. Simultaneously the two gas stream are brought to a mixing zone having a sufficient cross sectional area. Further, there is a very substantial linear length to the gas streams as they enter the mixing zone. The referenced linear length is represented by the discharge outlines of the chutes 34 and 36 where the two gas streams join. This feature contributes to effective mixing action and reduces the amount of noise generated by this process.

Further contributing to minimization of losses is the fact that the outer panel 40 of the lobes 33 are faired as they angle into the hot gas stream, and only their outer end portions, which are essentially parallel to the fan stream flow path, have relatively sharp corners joining the side walls 42 and 44. Since the outer lobe walls 40 are maintained at a maximum width to provide a maximum mass flow of the hot gas stream at the outer portions thereof in the discharge plane, there is a resultant tear-shaped configuration, as seen in FIGURES 4–7, due to the decrease in the diameter of the nacelle 18. This configuration is effective in efficiently guiding the fan stream to a reduced diameter.

Another factor contributing to minimization of losses in the mixer is found in the configuration of the fan stream duct 22 (FIGURE 1). For efficient fan operation the annular area of this duct is maintained essentially constant from the upstream edge of the nacelle 18 throughout a major portion of the duct length so that a relatively high velocity may be maintained during the major portion of fan stream travel down the duct 22. Immediately upstream of the mixer 30, the area of duct 22 is increased in a diffuser section 47 to decrease the fan stream velocity as it first enters the mixer. By having a lower velocity when there is an initial change in the fan stream flow path through the mixed and then accelerating the fan stream as it flows through the mixer, an optimum condition is established for minimizing flow losses.

A further point to be noted in connection with the mixer is that the relative changes in areas of the hot gas stream chutes 34 and fan stream chute 36 also provide approximately equal Mach numbers for the two streams as they are discharged from the exit plane. This provides an effective mixing action in a minimum of axial length and, again, with a minimum of losses.

The above described features, minimizing losses in the mixer, enable greater attainment of the potential efficiency of a mixed flow turbofan engine cycle and are of particular benefit when used to obtain sound reduction, now to be described. Certain features of the mixer 30 are separately claimed in a copending application Ser. No. 716,942, filed Mar. 28, 1968, and assigned to the assignee of this application.

The means for reducing the noise generated by the fan 16 include means for reducing the discharge area of the hot gas stream chutes 34. Preferably a flapper valve 48 forms the downstream portion of each chute wall 44 (FIGURES 2, 3, and 5). The flapper valves 48 are mounted on pins 50 which extend within the chute walls 38 into a cavity, further defined by a pluglike termination of the nacelle 18. Levers 52 are secured to the inner ends of each pin 50 and are connected to a unison ring 54. An actuator 56 may be connected to the unison ring 54 through a bell crank and selectively displaced to simultaneously swing the flapper valves 48, from their open, full line positions, as illustrated in FIGURES 3, 5 and 6, to their closed, dotted positions in which the discharge area of the hot gas stream chutes is substantially reduced. The actuator may be pneumatically powered by pressurized air supplied through tubes 57.

When this occurs, the pressure drop across the fan turbine 14 is decreased and there is a marked reduction in the rate of rotation of the fan rotor. The net result is that there is a reduction in the energy level of the fan stream. Consequently, the hot gas stream provides a greater portion of energy to the mixed stream which is discharge through the nozzle 32.

Under most operating conditions, it will be desirable to increase the energy level of the hot gas stream when the fan speed is reduced in order to maintain a desired propulsive thrust. This may be attained by increasing the rate of fuel flow to the core engine combustor 26, as is later discussed in greater detail.

In any event reduction of the discharge area of the hot gas stream chutes 34 and increases in the rate of fuel flow to the combustor 26 tend to increase the back pressure on the core engine compressor 24. To prevent aerodynamic overloading and stall of the core engine compressor 24, means are provided for diverting, or bleeding, a portion of the hot gas stream into the fan duct from a point intermediate the core engine turbine 28 and the fan turbine 14. To this end a plurality of passageways 60 (FIGURE 2) extend from the hot gas duct 25 into the fan duct 22. Preferably these passageways extend longitudinally and enter the duct 22 at a low angle, with their outlets aligned with the fan stream chutes 36 of the mixer (FIGURE 3).

Poppet valves 62 may be provided to selectively control flow through the passageways 60. The poppet valves 62 may be pneumatically operated and are shown with tubes 64 connecting opposite ends of a cylinder 66 to an appropriate means for porting air to one side or another of a valve piston 68 to open the valves or close them as desired.

When the valves 62 are open, during sound reduction operation, several advantages are obtained beyond reducing the aerodynamic loading on the core engine compressor 24. With the valves 62 open, the pressure drop across the fan turbine 14 is further decreased, thereby obtaining further reductions in the rate of rotation of the fan rotor and a consequent reduction in fan noise. Additionally, the turbine inlet temperature is reduced. The portion of the hot gas stream diverted into the fan duct is retained in the propulsive system and mixes with the fan stream prior to entering the mixer 30.

Figure 9:
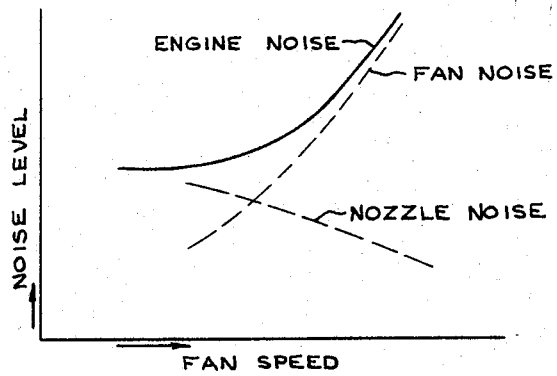
FIGURE 9 is a plot of the relative noise levels generated by the fan and propulsive nozzle of the present engine.

One of the significant factors in the present invention is that fan noise is substantially reduced without any increase in the overall engine noise. This is to say that as fan noise is reduced, the noise generated by discharge of the mixed gas stream from the nozzle 32 tends to become the predominant noise factor. FIGURE 9 illustrates that when the energy level of the hot gas stream is increased, the increase in noise from the nozzle 32 is at a relatively low rate, compared to the decrease in noise of the fan 16, thereby obtaining the desired reduction in engine noise level, while maintaining a desired, reduced thrust output.

Figure 10:
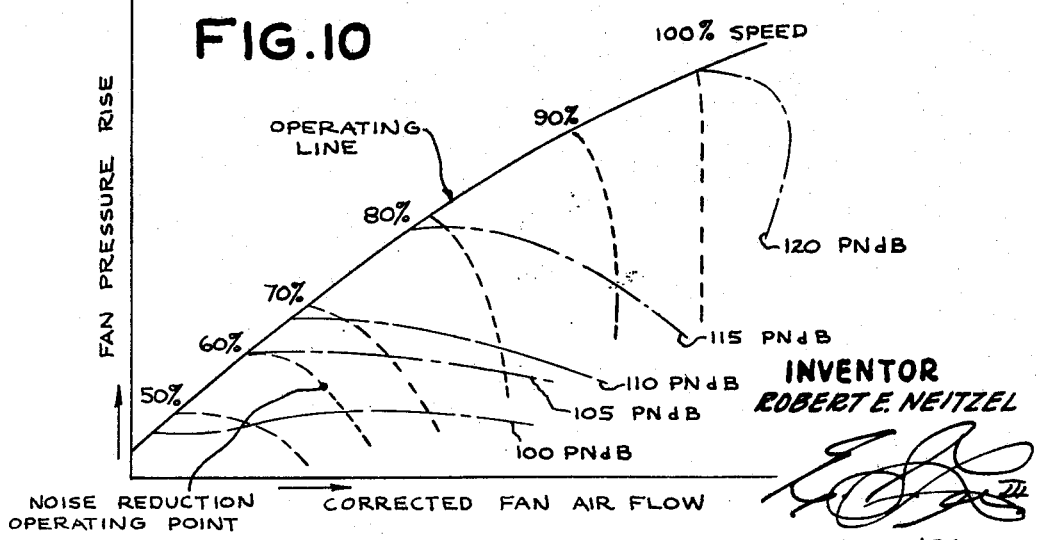
FIGURE 10 is a plot of the operating characteristics of the gas turbine engine fan and their relation to noise.

FIGURE 10 further illustrates some unobvious benefits in the noise reduction aspects of the invention, as they are best presented on a "compressor map." It is common practice to plot certain operating characteristics of compressors (a fan is a low pressure compressor) as they relate to corrected air flow through the compressor and the pressure rise across the compressor. FIGURE 10 is a representative compressor map for a low pressure compressor or fan, generally of the type shown in FIGURE 1. In normal operation or design operation, the pressure rise and corrected air flow for any given rotor speed are maintained below an operating line which provides a margin of safety so that there will be no aerodynamic overloading of the compressor or fan with resultant stall conditions. From this compressor map it will be apparent that when the fan rotor speed is dropped, there will be less pressure rise and less corrected air flow. It is contemplated that the fan rotor speed can be dropped to 60% as an illustrative value. This, it will be seen, provides a significant reduction in noise level as represented by the plots of perceived noise level (PNdB), also found in FIGURE 10. However, further advantages are obtained in noise reduction in that the increase in the proportion of hot gas flow to fan flow through the mixer provides an aspirator or pumping effect which increases mass flow through the fan. Thus, if the fan speed is reduced to 60%, the operating point under a noise reduction mode of operation would be below the operating line and the improvements in sound reduction are therefore greater than simply reducing fan speed to 60% and maintaining its operating point, i.e., pressure rise and corrected air flow, on the operating line.

The present propulsion system also has unobvious benefits in thrust reverse operation. One or more cascades of deflector vanes 100 are provided in the cowl 20 upstream of the mixer 30. In normal operation these cascades are covered by panels 102. When reverse thrust is desired, an actuator or plurality of actuators 104 are displaced and through appropriate linkage connections swing the panels 102 into the fan duct (see the dotted line position in FIGURE 2). The panels 102 which are preferably provided around the inner circumference of the cowl 20 provide a blocker which then diverts the fan air stream through the cascades 100 to provide the desired reverse thrust for the engine.

A high net reverse thrust effectiveness is attained in this fan configuration without the further necessity of reversing the thrust of the hot gas stream. This becomes apparent when it is recognized that in blocking off the flow of the fan stream to the mixer 30, the hot gas stream becomes overexpanded in the mixing zone and has a greatly reduced propulsive effect when discharged from the nozzle 32.

Normal operation of gas turbine engines used in the propulsion of aircraft is by means of a throttle lever. The throttle lever setting controls the rate of core engine rotor rotation which, in turn, is related to the desired thrust output from the engine or engines. It will be remembered that the sound reduction features of the present invention are employed when the engines are operating at less than their rated thrust, in which case the throttle lever would be demanding a core engine speed below its rated 100% value. FIGURE 11 illustrates, in a highly simplified fashion, an engine control system comprising a throttle lever 70 having an input to a main fuel control 71. The setting of the throttle lever 70 is the primary input to the main fuel control 71 for establishing the rate of flow of fuel to the combustor 26 to maintain a desired core engine rotor speed. The main fuel control would also have other parameter inputs (not shown) which would further regulate fuel flow to obtain the desired engine speed demanded by the setting of the throttle lever 70.

A selector switch 72 is provided for actuation of the sound reduction regime of operation. Preferably the switch 72 would be located in the aircraft cockpit and is herein shown as completing an electrical circuit to ground for actuating a sound reduction control 74. The sound reduction control 74 may comprise three units or portions respectively providing a mechanical output to the main fuel control 71, a pneumatic output connected to the bleed valves 62, and a pneumatic output to the actuator 56. Upon closure of the switch 72, the named outputs can be provided through the use of known means, such as solenoids and flow control valves which can be electrically actuated. The pneumatic output to the actuator 56 causes the flapper valves to swing to the phantom positions illustrated in FIGURE 5, while the pneumatic input to the bleed valves 62 causes these valves to open, thereby reducing the fan speed to obtain the sound reduction benefits discussed above. At the same time the mechanical output to the main fuel control increases fuel flow a predetermined amount sufficient to increase the energy level of the hot gas stream to a point where the loss in propulsive thrust due to the reduction in fan flow (a known factor) is compensated for by an increase in the energy level of the hot gas stream. This can be done by governing the core engine speed to a higher rate of rotation. Thus, whenever the sound reduction regime is actuated, there is no need to manipulate the throttle levers 70 to maintain a given thrust level.

A second switch 76 is provided in series with the actuation switch 72. This switch is controlled by a cam 78 which may be mechanically coupled to the throttle lever 70. The cam 78 opens the switch 76 whenever the setting of the throttle lever 70 is at a point where the throttle lever setting calls for a relatively high core engine speed.

FIGURE 12 shows an alternate control method wherein the throttle lever 70, in addition to its mechanical connection with the main fuel control 71, has mechanical inputs to the sound reduction control 74'. These mechanical inputs are made through lost motion connections 82, 86, illustrated by arms on the throttle lever which are engageable with slides, 84, 88 providing the mechanical inputs to the sound reduction control 74'. The lost motion connection 82 is arranged to provide a progressively increasing input to the portions of the sound reduction control 74' which provide outputs to the main fuel control 71 and to the actuator 56, respectively. The lost motion connection 86 is arranged to provide a progressively increasing mechanical input to the portion of the sound reduction control 74' which provides an output to the bleed valve 62, when the throttle lever 70 has been moved to a further reduced power setting.

The sound reduction control 74' differs from the sound reduction control 74 of FIGURE 11 in that its outputs are of progressively increasing magnitude as a function of throttle lever displacement to lower power settings, whereas in the sound reduction control 74, once it is energized, the outputs therefrom cause the bleed valves 62 to be fully opened and the actuator 56 and the flapper valves 48 controlled thereby to be displaced so that there is a predetermined reduction in the outlet areas of the hot gas stream chutes 34.

In operation, when the throttle lever 70 is moved to a predetermined position of reduced power demand, the discharge area of the hot gas chutes 34 will be progressively reduced, and the fan speed and noise generated thereby likewise reduced as core engine speed is increased to maintain the overall propulsive energy demanded by the power setting of the throttle lever 70. Initial reductions in the hot gas stream chute exit areas do not increase the back pressure on the core engine compressor 24 sufficiently to necessitate opening of the bleed valves 62. It is for this reason that there is a further delayed action through the lost motion connection 82 in providing this input to the sound reduction control 74'. In other words, when the throttle lever has been displaced to a sufficiently low power setting that the reduction in hot chute discharge area has caused such an increase, the bleed valves are opened for the reasons more fully discussed above. In this fashion it is possible to automatically insure a maximum degree of sound reduction consistent with an engine capability to provide the power level desired by the pilot in the setting of his throttle lever.

There are times in the operation of an aircraft where sound reduction is unnecessary or undesirable at reduced power settings. Consistent with this need, a selector switch 90 is provided. Again, it is contemplated that the elements of the sound reduction control 74' will be electrically energized to provide the described outputs. Switch 90 is illustrated as normally completing a circuit for energization of these outputs. When it is desired to inactuate the sound reduction control mode of operation at reduced power settings of the throttle lever 70, the switch 90 can be opened to revert the engine operation to its normal regime.

In the control systems of both FIGURES 11 and 12 there is a further advantage of obtaining rapid increases in thrust output. If, for example, a landing is aborted when its engines are operating under the sound reduction regime, the pilot would move the throttle lever to a maximum power setting. The flapper valves 48 would automatically move to their open positions and the bleed valves 62 would close. Since the core engine rotor is at a speed higher than normal for a conventional throttle lever setting, both it and the fan rotor will be accelerated to maximum speeds (to give maximum thrust) in a minimum of time.

Variation in the above description of applicant's invention will occur to those skilled in the art.

Having thus described the invention, what is claimed as novel and desired to be secured by Letters Patent of the United States is:

1. A gas turbine engine comprising,
a core engine for generating a hot gas stream,
a fan driven by the core engine,
a duct,
said fan pressuring a stream of air in said duct,
means for mixing at least a portion of said hot gas stream and at least a portion of said fan stream,
nozzle means downstream of said mixing means, from which said mixed stream is discharged to provide a propulsive force,
means for reducing the rate of rotation of said fan during operation of said gas turbine engine whereby said hot gas stream provides a greater proportion of energy to the mixed stream, and
means for increasing the energy level of the hot gas stream upon reduction of fan speed whereby a desired propulsive force may be maintained while obtaining a reduction in the overall noise generated by the engine.

2. A gas turbine engine as in claim 1 wherein,
the core engine comprises a compressor and
means are provided for reducing aerodynamic loading of said core engine compressor upon increasing in energy level of the hot gas stream when the fan speed is reduced.

3. A gas turbine engine as in claim 1, further comprising,
a fan turbine, downstream of said core engine, driven by said hot gas stream, said fan turbine being connected to said fan, whereby said fan is driven by said core engine, and
wherein the means for reducing the rate of rotation of said fan and providing the greater proportion of energy to the mixed stream from the gas stream comprise,
means for increasing the back pressure on said fan turbine to decrease the pressure drop thereacross and thereby reduce fan speed.

4. A gas turbine engine as in claim 3 wherein,
the mixing means comprise a plurality of mixing passageways downstream of the fan turbine, through which the hot gas stream passes to mix with the fan stream, and
the means for increasing the back pressure on said fan turbine comprise means for decreasing the areas of said mixing passageways.

5. A gas turbine engine as in claim 4 wherein,
said core engine is housed within a nacelle,
said fan comprises a bladed rotor upstream of said nacelle,
an outer casing surrounds said fan rotor and extends concentrically of said nacelle, downstream of said fan turbine, terminating in said mixed stream discharge nozzle,
said outer casing and nacelle forming said duct which is annular and receives the pressured fan air stream, and
further wherein, the mixing means comprise a plurality of lobes extending into the fan duct and defining chutes which provide the passageways for the hot gas stream as well as defining chutes, through which the fan stream passes, to mix with the hot gas stream at the downstream ends of said lobes.

6. A gas turbine engine as in claim 5 wherein,
the hot gas stream and fan stream chutes have larger areas at their inlets than at their outlets, whereby said streams are accelerated as they pass through the mixer.

7. A gas turbine engine as in claim 5 wherein,
the relative areas of the fan stream chutes and hot gas stream chutes provide approximately equal Mach numbers to the hot gas stream and the fan stream as they are discharged from the mixer, when operating at a given design condition.

8. A gas turbine engine as in claim 7 wherein,
the relative dimensions of the outlets of the hot gas stream and the fan stream chutes provide approximately equal mass flow rates into the discharge plane.

9. A gas turbine engine as in claim 5 wherein,
the forward end of the nacelle and the outer casing define a duct having a substantially constant annular area from the duct inlet to adjacent said mixer, whereby the fan stream flow is maintained at a relatively high velocity, and
a diffuser section, formed by an increase in annular area, immediately upstream of said mixer, whereby the velocity of the fan stream is reduced as it enters said mixer.

10. A gas turbine engine as in claim 5, further including,
thrust reverser cascade means in said outer casing, and
means for blocking flow of the fan stream through said duct, upstream of said mixer, and diverting it through said thrust reverser cascade means, whereby reverse thrust is provided and the forward thrust of the hot gas steam is automatically spoiled.

11. A gas turbine engine as in claim 10 wherein,
the means for blocking fan stream flow comprise,
panel means normally covering said cascade means and means for swinging said panel means into flow blocking position.

12. A gas turbine engine as in claim 1 wherein, selectively actuated means are provided for bleeding a portion of the hot gas stream into the fan duct from intermediate the discharge end of the core engine and the fan turbine.

13. A gas turbine engine as in claim 12 wherein,
said core engine is housed within a nacelle,
said fan comprises a bladed rotor upstream of said nacelle,
an outer casing surrounds said fan rotor and extends concentrically of said nacelle downstream of said fan turbine, terminating in said mixed stream discharge nozzle,
said outer casing and nacelle form said duct, which is annular and receives the pressurized fan air stream, and further wherein,
the mixing means comprise a plurality of lobes extending into the fan duct and defining chutes, through which the hot gas stream and the fan stream pass to mix at the downstream ends of said lobes,
the means for increasing the back pressure on said turbine comprise means for decreasing the outlet areas of the hot gas stream chutes, and
the bleeding means discharge the bled portion of the hot gas stream into the fan duct upstream of said mixer.

14. A gas turbine engine as in claim 13 wherein, the bleeding means comprise a plurality of passageways extending from the hot gas stream into said fan duct, the openings of said bleeding passageways into the fan duct being respectively aligned with the fan stream chutes of said mixer.

15. A gas turbine engine comprising,
a core engine for generating a hot gas stream,
a nacelle within which said core engine is housed,
a fan comprising a bladed rotor disposed upstream of said core engine and nacelle,
a fan turbine downstream of said core engine and driven by said hot gas stream, said fan turbine being connected to and driving said fan rotor,
an outer casing surrounding said fan rotor and extending concentrically of said nacelle downstream of said fan turbine, said outer casing terminating in a discharge nozzle,
said outer casing and nacelle forming an annular duct which receives a pressurized fan air stream,
a mixer comprising a plurality of lobes extending into the fan duct and defining chutes through which the hot gas stream and the fan stream pass to mix at the downstream ends of said lobes to provide a mixed stream for discharge from said nozzle, said chutes having a greater area at their entrances than at their outlets, whereby said streams are accelerated as they pass through said mixer,
said annular duct having a substantially constant annular area from a point adjacent its upstream end to a diffuser section of increased annular area immediately upstream of said mixer, whereby the fan stream flow is maintained at a relatively high velocity during transit from said upstream point to said diffuser section and reduced in velocity as it enters said mixer.

16. A gas turbine engine as in claim 15 wherein,
the relative areas of the fan stream chutes and the hot gas stream chutes provide approximately equal Mach. numbers to said streams as they are discharged from said mixer when operating at a given design condition.

17. In a gas turbine engine having,
first duct means for a gas stream passing therethrough in a given direction and annular duct means, surrounding said first duct means, for a second gas stream traveling therethrough in said given direction,
mixing means upstream of the end of the outer wall of said annular duct means, said mixing means comprising,
a plurality of lobes angled from said first duct means outwardly into said annular duct means in the direction of gas flow, said lobes defining alternate chutes for the discharge of the two gas streams into a common plenum,
said chutes being characterized by an area reduction from their inlets to their outlets whereby their gas streams are accelerated therethrough.

18. A gas turbine engine comprising,
a core engine for generating a hot gas stream,
a nacelle within which said core engine is housed,
a fan comprising a bladed rotor disposed upstream of said core engine and nacelle,
a fan turbine downstream of said core engine and driven by said hot gas stream, said fan turbine being connected to and driving said fan rotor,
an outer casing surrounding said fan rotor and extending concentrically of said nacelle downstream of said fan turbine, said outer casing terminating in a discharge nozzle,
said outer casing and nacelle forming an annular duct which receives a pressurized fan air stream,
a mixer comprising a plurality of lobes extending into the fan duct and defining chutes through which the hot gas stream and the fan stream pass to mix at the downstream ends of said lobes to provide a mixed stream for discharge from said nozzle,
thrust reverser cascade means in said outer casing, and
means for blocking flow of the fan stream through said duct, upstream of said mixer, and diverting it through said thrust reverser cascade means, whereby reverse thrust is provided and the forward thrust of the hot gas stream is automatically spoiled.

19. A gas turbine engine as in claim 20 wherein,
the means for blocking the fan stream flow comprise,
panel means normally covering said cascade means and means for swinging said panel means into flow blocking position.

20. A turbine engine comprising,
a core engine having in series flow relation a compressor, a combustor and a turbine, said turbine and compressor having joined rotors forming a core engine rotor,
means for supplying fuel to said combustor whereby the core engine generates a hot gas stream,
a fan having a rotor driven by said engine and pressurizing a fan stream of pressurized air,
nozzle means through which the fan stream and the hot gas stream are discharged to provide a propulsive force,
means for reducing the rate of rotation of said fan rotor, and
means for increasing flow of fuel to said combustor to increase the energy level of said hot gas stream when the rate of rotation of said fan rotor is reduced, whereby the noise generated by the fan is reduced and the reduction in the propulsive force derived from the fan stream is compensated for by an increase in propulsive force derived from the hot gas stream.

21. A turbine engine comprising,
a core engine having in series flow relation a compressor, a combustor and a turbine, said turbine and compressor having joined rotors forming a core engine rotor,
a fan having a rotor driven by said engine and pressurizing a fan stream of pressurized air,
nozzle means through which the fan stream and the hot gas stream are discharged to provide a propulsive force,
a pilot actuated throttle lever,
means, responsive to the selected position of said throttle lever, for supplying fuel to said combustor to generate a hot gas stream and maintain a given rate of rotation of said core engine rotor,
means for reducing the rate of rotation of said fan rotor, and means for increasing the energy level of said hot gas stream, including means for automatically increasing the rate of rotation of the core engine rotor when the rate of rotation of the fan rotor is decreased.

22. A gas turbine engine as in claim 21 wherein, means are provided for preventing a reduction in the rate of rotation of said fan rotor when said throttle lever is in a position calling for a rate of core engine rotor rotation above a given level.

23. A gas turbine engine as in claim 22 wherein, throttle lever movement past a given position automatically actuates said preventing means.

24. A gas turbine engine as in claim 21 further comprising,
a fan turbine driven by the hot gas stream of said core engine to thereby drive said fan rotor,
means including a plurality of mixing passageways downstream of the fan turbine for mixing said hot gas stream and said fan stream,
the nozzle means comprise a common nozzle through which said mixed stream is discharged, and
the means for reducing fan speed comprise means for decreasing the outlet areas of said hot gas stream mixing passageways to thereby increase the back pressure on said fan turbine and decrease the rate of fan rotor rotation.

25. A gas turbine engine as in claim 24 wherein
means are provided for bleeding a portion of the hot gas stream into the fan duct from a point intermediate the discharge end of said core engine and the fan turbine, and
means are provided for automatically actuating said bleeding means upon actuation of said fan speed reducing means.

26. A gas turbine engine as in claim 25 wherein,
the means for decreasing the outlet areas of said hot gas stream mixing passageways reduce said areas a given amount upon actuation of said fan speed reducing means, and
the bleeding means bleed a given portion of hot gas stream upon actuation.

27. A gas turbine engine as in claim 25 wherein,
the bleed means are actuated when the rate of rotation of the core engine has been increased a predetermined amount when the rate of rotation of the fan rotor is reduced.

28. A gas turbine engine as in claim 21 wherein,
the means for decreasing the fan speed and increasing the energy level of the hot gas stream are automatically actuated upon movement of the throttle lever to position calling for a given reduced rate of core engine rotation, said energy increasing means and said fan speed reducing means being progressively increased and decreased respectively upon movement of the throttle lever to positions demanding further rates of rotation of the core engine rotor.

29. A gas turbine engine as in claim 28 wherein,
means are provided for bleeding a portion of the hot gas stream into the fan duct from a point intermediate the discharge end of the core engine and the fan turbine, and
means are provided for automatically actuating said bleeding means in response to movement of the throttle lever to a position demanding a lower core engine rotor speed than the position which actuated said sound reducing and energy level increasing means.

30. A gas turbine engine as in claim 28 wherein,
selectively actuated means are provided for inactivating the fan speed reducing means and the hot gas stream energy increasing means.

References Cited

UNITED STATES PATENTS

| | | | |
|---|---|---|---|
| 2,529,973 | 11/1950 | Sedille et al. | 60—262 |
| 2,929,203 | 3/1960 | Henning et al. | 60—261 |
| 2,978,865 | 4/1961 | Pierce | 60—261 |
| 2,999,672 | 9/1961 | Harshman | 60—261 |
| 3,048,376 | 8/1962 | Howald et al. | 60—262 |
| 3,118,276 | 1/1964 | Keenan et al. | 60—261 |
| 3,196,608 | 7/1965 | Tindale | 60—262 |
| 3,196,609 | 7/1965 | Ingram et al. | 60—262 |

SAMUEL FEINBERG, Primary Examiner

U.S. Cl. X.R.

60—39.16, 229, 236, 262

PO-1050
(5/69)

UNITED STATES PATENT OFFICE
CERTIFICATE OF CORRECTION

Patent No. 3,508,403        Dated     April 28, 1970

Inventor(s)      Robert E. Neitzel

It is certified that error appears in the above-identified patent and that said Letters Patent are hereby corrected as shown below:

Column 9, line 52, delete the word "pressuring" and insert --pressurizing-- in place thereof;

Column 10, line 28, delete the word "pressured" and insert --pressurized-- in place thereof; and Column 12, line 33, delete the numeral "20" and insert --18-- in place thereof.

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents